United States Patent
Gadkaree et al.

(10) Patent No.: US 7,976,587 B2
(45) Date of Patent: Jul. 12, 2011

(54) HIGH ENERGY DENSITY ULTRACAPACITOR

(75) Inventors: Kishor Purushottam Gadkaree, Big Flats, NY (US); Joseph Frank Mach, Lindley, NY (US)

(73) Assignee: Corning Incorporated, Corning, NY (US)

( * ) Notice: Subject to any disclaimer, the term of this patent is extended or adjusted under 35 U.S.C. 154(b) by 552 days.

(21) Appl. No.: 11/980,883

(22) Filed: Oct. 31, 2007

(65) Prior Publication Data

US 2009/0109599 A1    Apr. 30, 2009

(51) Int. Cl.
*H01G 9/00*    (2006.01)
(52) U.S. Cl. ...................................... 29/25.03
(58) Field of Classification Search .................. 29/25.03
See application file for complete search history.

(56) References Cited

U.S. PATENT DOCUMENTS

| | | | |
|---|---|---|---|
| 6,201,685 B1 | 3/2001 | Jerabek et al. | |
| 6,212,062 B1 | 4/2001 | Day et al. | |
| 6,225,733 B1 | 5/2001 | Gadkaree et al. | 1/2 |
| 6,304,426 B1 | 10/2001 | Wei et al. | 9/155 |
| 6,487,066 B1 | 11/2002 | Niiori et al. | |
| 6,565,701 B1 | 5/2003 | Jerabek et al. | |
| 6,565,763 B1 * | 5/2003 | Asakawa et al. | 216/56 |
| 6,714,391 B2 | 3/2004 | Wilk et al. | 2/12 |
| 6,738,252 B2 | 5/2004 | Okamura et al. | 31/12 |
| 2004/0085710 A1 | 5/2004 | Takeuchi et al. | |
| 2005/0169829 A1 | 8/2005 | Dai et al. | 423/445 |

FOREIGN PATENT DOCUMENTS

| | | |
|---|---|---|
| JP | 4-175277 | 6/1992 |
| JP | 5-21274 | 1/1993 |
| JP | 1-196807 | 8/1999 |
| JP | 2005-235918 | 9/2005 |
| JP | 2007-91511 | 4/2007 |
| KR | 2003-0033789 | 5/2003 |

* cited by examiner

*Primary Examiner* — Charles D Garber
*Assistant Examiner* — Seahvosh J Nikmanesh
(74) *Attorney, Agent, or Firm* — Michael W. Russell

(57) ABSTRACT

The invention is directed to a carbon composition produced from a carbon precursor, a carbon precursor modifier, and an additive, wherein a mixture of the recited components is formed, the carbon precursor is cured, the resulting mixture carbonized to produce a porous carbon composition. Also disclosed are methods for preparing the carbon composition and for using the carbon composition to fabricate electrodes and electric double layer capacitors comprising the carbon composition.

9 Claims, 1 Drawing Sheet

HIGH ENERGY DENSITY ULTRACAPACITOR

BACKGROUND OF THE INVENTION

1. Field of the Invention

The present invention relates to carbon materials and methods of manufacturing, and specifically to carbon materials suitable for use in electrodes and other components used in high energy density storage devices, such as electric double layer capacitors.

2. Technical Background

High density energy storage devices, such as electric double layer capacitors, have been the subject of considerable research. An electric double layer capacitor or EDLC is a type of capacitor that typically consists of carbon electrodes separated by a porous separator, current collectors, and an electrolyte solution. When an electric potential is applied to an EDLC, ionic current flows due to the attraction of anions to the positive electrode and cations to the negative electrode. This ionic current flow generates an electric charge that is stored at the interface between each polarized electrode and the electrolyte solution.

The design of an EDLC can vary depending on the intended application and can include, for example, standard jelly roll designs, prismatic designs, honeycomb designs, hybrid designs, or other designs known in the art. The energy density and the specific power of an EDLC can be affected by the properties of the components comprising the EDLC, including the electrode and the electrolyte utilized. With respect to the electrode, high surface area carbons, carbon nanotubes, other forms of carbon, and composite materials have been utilized in manufacturing such devices.

Conventional carbons for EDLC electrodes can be prepared from natural materials such as wood, charcoal and coal tar pitch, or from synthetic materials such as resins. Where synthetic precursors are utilized, the precursor is typically first crosslinked to solidify the precursor, carbonized in an inert atmosphere (such as nitrogen) and then activated. The activation is usually performed by heating the carbon at high temperatures (800-900° C.) in a partially oxidized atmosphere (such as carbon dioxide). During the carbonization/activation process, a large number of micropores are formed in the surface of the carbon material. These micropores increase the surface area of the carbon which results in increased capacitance. Other conventional carbons for electrodes can be formed from cured synthetic precursors that are treated with alkali or acids and then further treated at high temperatures to create porosity.

EDLC's incorporating carbon electrodes manufactured by such conventional processes usually have an energy density within the range of 6-7 Wh/l. However, this energy density range is not sufficient or practical for high energy applications, such as hybrid vehicles. Accordingly, a new carbon material for use with EDLC's suited for high energy applications is needed.

Thus, there is a need to address the aforementioned problems and other shortcomings associated with the traditional electric double layer capacitors. These needs and other needs are satisfied by the carbon compositions and methods of the present invention.

SUMMARY OF THE INVENTION

The present invention relates to carbon materials and methods of manufacturing, and specifically to carbon materials suitable for use in electrodes and other components used in high energy density storage devices, such as, for example, electric double layer capacitors. The present invention addresses at least a portion of the problems described above through the use of a novel carbon composition.

In a first aspect, the present invention provides a method for making a carbon composition, the method comprising contacting a carbon precursor, a carbon precursor modifier, and an additive to form a mixture; curing at least the carbon precursor; and then carbonizing at least a portion of the mixture to form a carbon composition; wherein the carbon precursor is non-graphitizable, and wherein the carbon precursor modifier comprises a sulfur compound, a crosslinkable resin, a surfactant, or a combination thereof.

In a second detailed aspect, the present invention provides a carbon composition produced by the method described above.

In yet a third aspect, the present invention provides an electric double layer capacitor comprising at least one electrode comprising a carbon composition formed from an uncured, synthetic, non-graphitizable carbon precursor, wherein the electric double layer capacitor has an energy density of at least about 14 Wh/l.

Additional aspects and advantages of the invention will be set forth, in part, in the detailed description and any claims which follow, and in part will be derived from the detailed description or can be learned by practice of the invention. The advantages described below will be realized and attained by means of the elements and combinations particularly pointed out in the appended claims. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate several aspects described below. Like numbers represent the same elements throughout the FIGURE

DETAILED DESCRIPTION OF THE INVENTION

Figure 1:
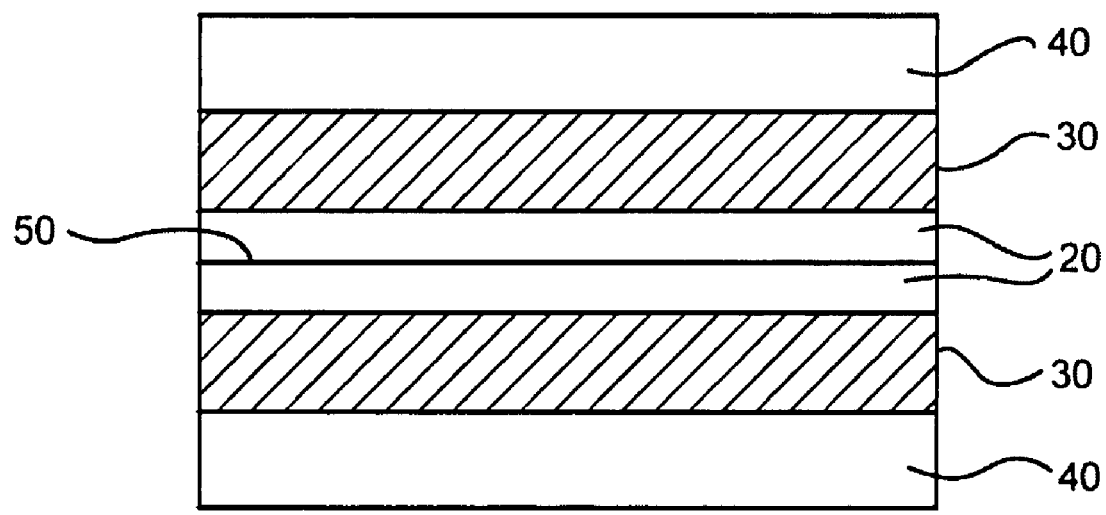
FIG. 1 is a schematic view of an EDLC formed in accordance with various aspects of the present invention.

The present invention can be understood more readily by reference to the following detailed description, examples, and claims, and their previous and following description. However, before the present compositions, articles, devices, and methods are disclosed and described, it is to be understood that this invention is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its currently known aspects. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination aspect, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

In this specification and in the claims which follow, reference will be made to a number of terms which shall be defined to have the following meanings:

As used herein, the singular forms "a," "an" and "the" include plural referents unless the context clearly dictates otherwise. Thus, for example, reference to a "compound" includes aspects having two or more such compounds, unless the context clearly indicates otherwise.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, a "wt. %" or "weight percent" or "percent by weight" of a component, unless specifically stated to the contrary, refers to the ratio of the weight of the component to the total weight of the composition in which the component is included, expressed as a percentage.

As used herein, an electric double layer capacitor or "EDLC" refers to any device configured to store a charge including, for example, a supercapacitor, an ultracapacitor, a device having a standard jelly roll design, a prismatic design, a honeycomb design, a hybrid design, or other designs known in the art.

As used herein, the terms "mix" or "mixing" are intended to refer to contacting of materials so as to provide a mixture. It is not required that a mixture be homogeneous or that any of the components of a mixture be distributed throughout a mixture in a uniform manner.

As briefly introduced above, the present invention provides a novel carbon composition that can be used in, for example, electric double layer capacitors. The present invention also provides methods for making and using the novel carbon composition in, for example, electrodes and other components of energy storage devices, such as electric double layer capacitors.

The method for making the novel carbon composition of the present invention comprises, in various aspects, contacting a carbon precursor, a carbon precursor modifier, and an additive to form a mixture; curing at least the carbon precursor; and then carbonizing at least a portion of the mixture to form a carbon composition. Each of the components of the carbon composition and the steps of the methods to make and use the carbon composition are described in detail herein. While specific combinations and concentrations of individual components are described herein, it is intended that the present invention include all related aspects and variations, including those not specifically recited, but that one of skill in the art could determine from the present application.

Carbon Precursor

The carbon precursor of the present invention can comprise any suitable precursor material that can provide, upon curing and/or carbonization, a carbon composition suitable for use in, for example, an electric double layer capacitor. The specific carbon precursor used to prepare a given carbon composition can vary depending on, for example, the intended application. The carbon precursor can also comprise one or more individual carbon precursors that can be contacted and/or mixed together.

The carbon precursor of the present invention can, in various aspects, comprise a polymeric and/or resin material that can be carbonized to produce a carbon composition. In other aspects, the carbon precursor is uncured or substantially uncured.

The carbon precursor of the present invention can comprise a synthetic carbon precursor material, a naturally occurring carbon precursor material, or a combination thereof. In one aspect, the carbon precursor comprises a synthetic material. A variety of synthetic carbon precursors can be utilized with the methods of the invention to yield the novel carbon composition. A synthetic carbon precursor can, in various aspects, have fewer impurities than naturally occurring carbon precursor materials. In various aspects, a synthetic carbon precursor comprises no or substantially no impurities that can, for example, react with other components and/or the electrolyte solution of an EDLC. In various aspects, a synthetic carbon precursor can provide improved processing and/or performance over naturally occurring carbon precursors.

In one aspect, the carbon precursor can comprise a non-graphitizable material, such as, for example, a polymeric material that leaves greater than 10% carbon yield upon carbonization. As used herein, the term "non-graphitizable" is intended to refer to both aspects wherein none of the carbon precursor is graphitizable, and aspects wherein the carbon precursor is substantially non-graphitizable. In one aspect, none of the carbon precursor is graphitizable. In another aspect, the carbon precursor is substantially non-graphitizable. In a specific aspect, a carbon precursor can comprise a substantially non-graphitizable polymeric material, wherein a substantial portion of carbon does not form graphite like crystals or platelets on carbonization. It should be understood that many organic materials, such as, for example, polymeric materials and resins, can form graphitic domains upon heating or carbonization. In one aspect, the non-graphitizable material of the present invention can comprise such graphitic domains, provided that any graphitic domains, if present, are substantially randomly oriented and/or do not exhibit long range order. The bulk properties of such a material, once carbonized, should be characteristic of a substantially amorphous material and not of long range order of graphitic domains, such as, for example, conductivity that can be found in graphite materials.

Examples of useful carbon precursors include crosslinkable resins, such as thermosetting resins. The carbon precursor can be uncured or substantially uncured at the time of mixing with an additive and a modifier. An uncured carbon precursor will not be substantially crosslinked, and thus, will remain at a soluble reactive oligomer stage. As discussed herein, an uncrosslinked carbon precursor can allow formation of a molecular level composite of the carbon precursor and the additive that is not possible in conventional processes wherein the carbon precursor is already crosslinked.

A carbon precursor can be in any suitable form for use with the methods of the present invention. In various aspects, the carbon precursor is a liquid or a solid. Examples of liquid carbon precursors include phenolic and furan based resins. Phenolic resins, such as, for example, resole and novelac, characteristically have low viscosity, high carbon yield, high degree of crosslinking upon curing relative to other precursors, and are relatively low cost. Phenolic resins such as those available from Occidental Chemical Corporation, Niagara Falls, N.Y. under the product name of Plyophen 43290 can be used. Plyophen 43290 is a liquid one step phenolic resin containing phenol, formaldehyde, and water, having a specific gravity of 1.22-1.24, a boiling point of 100° C. and a pH of 7.5-7.7@100 gm/l. Other phenolic resins, such as those available from Borden Chemical Co. under the product name of Durite can be used. Durite resins are chemically similar to Plyophen 43290 but have a viscosity of about 300 cps. Furan resins, such as those available from QO Chemicals, Inc. under the name of Furcarb® LP, can also be used. Furcarb® LP resins are preparations of phenol (4% max) in furfuryl alcohol, and have a specific gravity of 1.2, a boiling point of 170° C., and a viscosity of 300 cps.

Solid form resins such as phenolic novolac can also be used as the carbon precursor. If the carbon precursor is a solid or substantially solid at room temperature (i.e., phenolic novalac), then the carbon precursor can be dissolved in a suitable solvent, such as, for example, acetone, to first form a liquid solution in which the additive and modifier can be added.

Carbon Precursor Modifier

In addition to a carbon precursor, the present invention comprises a carbon precursor modifier. The presence of a carbon precursor modifier, as described herein, can, in various aspects, improve the performance of a carbon composition in, for example, an electric double layer capacitor. In various aspects, a carbon precursor modifier can comprise a sulfur compound, a crosslinkable resin, an organic modifier, or a combination thereof. A carbon precursor modifier can comprise one or more individual carbon precursor modifiers that can be contacted and/or mixed together.

In one aspect, a carbon precursor modifier can comprise a sulfur compound, such as, for example, elemental sulfur, a sulfide, or a combination thereof. In a specific aspect, a carbon precursor modifier comprises elemental sulfur. It is preferred that the carbon precursor modifier not comprise a sulfate or an oxygen containing organic sulfur species. While not wishing to be bound by theory, it is believed that the presence of sulfur in a carbon precursor can reduce the impact of water on the performance of the carbon composition and thus, an energy storage device in which the carbon composition is used.

In another aspect, a carbon precursor modifier can comprise a crosslinkable resin. If a carbon precursor modifier comprises a crosslinkable resin, it is intended that the carbon precursor modifier comprise a different crosslinkable resin from the carbon precursor with which it will be contacted. Thus, a carbon precursor modifier can comprise a crosslinkable resin, such as, for example, a thermosetting resin, that is either similar to or different from the carbon precursor.

If the carbon precursor modifier comprises a crosslinkable resin, it is preferred that the crosslinkable resin carbon precursor modifier be non-graphitizable, as defined above with respect to a carbon precursor. As with the carbon precursor, it is also preferred that the carbon precursor modifier be uncured or substantially uncured. Exemplary crosslinkable resin carbon precursor modifiers can comprise furfuryl alcohol, furfuryl alcohol based resins, furan based resins, urea formaldehyde resins, melamine formaldehyde resins, and combinations thereof. In a preferred aspect, the carbon precursor modifier comprises a furfuryl alcohol, a furfuryl alcohol based resin, or a combination thereof.

In yet another aspect, a carbon precursor modifier can comprise a surfactant.

A carbon precursor modifier can be in any suitable form for use with the methods of the present invention. In various aspects, the carbon precursor modifier is a liquid or a solid. Carbon precursor modifiers, such as those described herein, are commercially available, and one of skill in the art could readily select an appropriate carbon precursor modifier based on the methods of the present invention.

Additive

The additive of the present invention can comprise any suitable material that can, when used in any of the various aspects of the methods of the present invention, provide a carbon composition having a controlled porosity and enhanced pore diameter. The additive can comprise one or more individual additives that can be contacted and/or mixed together. In one aspect, the additive of the present invention leaves no or substantially no carbon behind after carbonization. In a specific aspect, the additive of the present invention leaves no carbon behind after carbonization.

In another aspect, an additive comprises an inorganic compound. In a specific aspect, an additive comprises an alkali or non alkali salt, oxide, or hydroxide that can allow curing of a resin. Exemplary additive materials can comprise potassium hydroxide, sodium hydroxide, potassium chloride, sodium chloride, and combinations thereof. A variety of other inorganic salts such as zinc chloride or other inorganic molecules can similarly be used with the methods and materials of the invention, and accordingly, the invention should not be limited to the particular examples recited herein.

The carbon precursors, carbon precursor modifiers, and additives described herein can be used to form the novel carbon composition of the present invention. It should be noted that, where specific exemplary materials are recited, the present invention is not intended to be limited to the recited examples and is intended to include other materials that may be suitable for use in the methods of the present invention to prepare the novel carbon composition.

Method for Preparing Inventive Carbon Composition

The present invention provides various methods for preparing and using the novel carbon composition. While not wishing to be bound by theory, it is believed that mixing a carbon precursor with an additive, prior to curing the carbon precursor, can allow the carbon precursor to better accept and bind with the additive to provide for uniform distribution of the additive molecule in the carbon precursor. Moreover, it is believed that by mixing the carbon precursor with the additive prior to cure, the additive will distribute uniformly within the carbon precursor so that when carbonized, the carbon will condense or crosslink around the additive to eventually yield a carbon material with controlled or expected porosity and enhanced pore diameters in a way that is unique as compared to carbons manufactured by conventional processes. The addition of a carbon precursor modifier to the carbon precursor, prior to curing, can also provide improved materials properties, such as reduced impact of water impurities on the long term performance of an electric double layer capacitor in which the carbon composition is used.

The carbon precursor can be mixed with the carbon precursor modifier and the additive in any order and by any conventional method, including introduction of each of the components into mixing vessel followed by agitation. In one aspect, the carbon precursor is contacted with and/or mixed with the carbon precursor modifier, prior to be contact with and/or mixed with the additive. In another aspect, one of the carbon precursor and carbon precursor modifier can be first mixed with the additive. Each component of the carbon precursor, carbon precursor modifier, and additive can be added at once or in multiple aliquots. In another aspect, the carbon precursor, carbon precursor modifier, and additive, after contacting and/or mixing, are uniformly or substantially uniformly mixed.

The amounts of each of the carbon precursor, carbon precursor modifier, and additive can vary, depending upon the desired properties of the novel carbon composition. The specific concentrations of each component are not critical, provided that the novel carbon composition formed from the methods of the present invention can be used in an energy storage device, such as an electric double layer capacitor. In various aspects, a mixture can comprise from about 10 wt. % to about 95 wt. %, for example, about 10, 15, 20, 30, 40, 50, 60, 70, 75, 80, 85, 89, 90, 92, or 95 wt. % of a carbon precursor. In other various aspects, a mixture can comprise from about 50 wt. % to about 95 wt. %, for example, about 50, 60, 70, 75, 80, 85, 89, 90, 92, or 95 wt. % of a carbon precursor on a solids basis. In still other aspects, a mixture can comprise from about 1 wt. % to about 60 wt. %, for example, about 1, 2, 3, 5, 8, 10, 15, 20, 30, 40, 50, or 60 wt. % of a carbon precursor modifier. In a specific aspect, a mixture can comprise from about 1 wt. % to about 10 wt. % of a surfactant carbon precursor modifier, for example, about 1, 2, 3, 4, 5, 6, 7, 8, 9, or 10 wt. %; preferably from about 1 wt. % to about 5 wt. % of a surfactant carbon precursor modifier.

Similarly, a mixture can comprise a varying amount of an additive, depending upon the carbon precursor, carbon precursor modifier, and the composition of the additive. In one aspect, the amount of additive in a mixture can be expressed as a ratio of the carbon precursor to the additive, for example, from about 2:1 carbon precursor to additive to about 1:5 carbon precursor to additive, for example, about 2:1, 1.5:1, 1:1, 1:1.5, 1:2, 1:3, 1:4, or 1:5 carbon precursor to additive. For example, a mixture comprising about 100 g of a carbon precursor can have from about 50 g to about 500 g of an additive, such as, for example, a 40 wt. % potassium hydroxide solution. If calculated on a solids basis, the ratio can be from about 5:1 to about 1:5 carbon precursor to additive. When expressed as a ratio, the carbon precursor can comprise the carbon precursor alone or the combination of carbon precursor and carbon precursor modifier.

In a specific aspect, a mixture comprises from about 1 wt. % to about 25 wt. %, for example, about 1, 2, 3, 4, 5, 6, 7, 9, 10, 12, 15, 18, 20, 22, or 25 wt. % sulfur; from about 50 wt. % to about 90 wt. %, for example, 50, 55, 60, 65, 70, 75, 80, 85, or 90 wt. % of a phenolic resin; and an additive in a ratio of carbon precursor to additive of about 1:5 to about 2:5.

In another specific aspect, a mixture comprises from about 10 wt. % to about 50 wt. %, for example, about 10, 12, 15, 18, 20, 22, 25, 28, 30, 33, 36, 40, 42, 44, 46, 48, or 50 wt. % of a phenolic resin; from about 10 wt. % to about 50 wt. %, for example, about 10, 12, 15, 18, 20, 22, 25, 28, 30, 33, 36, 39, 40, 42, 44, 46, 48, or 50 wt. % of a furan carbon precursor modifier; and an additive in a ratio of carbon precursor to additive of about 1:5 to 2:5. In one exemplary aspect, the amount of additive for a mixture comprising about 100 g of a carbon precursor and carbon precursor modifier, and a ratio of carbon precursor to additive of about 1:5, can be about 500 g.

Where an inorganic salt or hydroxide, such as potassium hydroxide, and a synthetic non-graphitizable resin are used as the additive and carbon precursor, respectively, the ratio of the amount of carbon precursor and carbon precursor modifier to potassium hydroxide can be, in one aspect, about 1:2 on a dry weight basis. However, it is contemplated that the ratio of carbon precursor and carbon precursor modifier to additive can vary as described herein.

In addition, the carbon precursor, carbon precursor modifier, and/or additive can be mixed with an appropriate solvent. For example, an additive (i.e., potassium hydroxide) can be mixed with a solvent such as water in the range of 5-60 wt % and preferably 25-50 wt %. This solution can then be mixed with a carbon precursor solution (i.e., resole) and/or the carbon precursor modifier solution wherein either the carbon precursor solution, the carbon precursor modifier solution, or both have been mixed with water in the range of 5-80 wt % and preferably 40-80 wt %. It is preferred that each of the components be added in a form and in a manner that can allow uniform or substantial uniform distribution throughout the mixture.

The contacting and/or mixing step can, in various aspects, allow molecular level mixing and uniform distribution of the additive throughout the carbon precursor and carbon precursor modifier. The uniform mixing can be the result of using an uncured carbon precursor so that significant, if any, crosslinking has not taken place. Particularly, as discussed above, a carbon precursor and/or a carbon precursor modifier, such as phenolic resin, can be uncrosslinked (e.g., precursors that are not fully crosslinked or are at a soluble reactive oligomer stage). The oligomer solution can be mixed with an additive (i.e., an alkali solution in water). This process can allow molecular level mixing of, for example, phenol-formaldehyde oligomers and the additive. The mixture may then be thermally treated to create a molecular-composite of the precursor and the additive. Alternatively, any suitable technique for drying and/or curing the mixture can be used to provide an at least partially crosslinked mixture. In one aspect, the mixture is subjected to a drying and/or heating technique such that it is forms a substantially crosslinked solid.

The mixture described herein may then be carbonized by any conventional method to allow, for example, atomic level incorporation of the additive. During carbonization, an amorphous carbon is able to form around the additive. Particularly, during carbonization, low molecular weight organic compounds can be broken off of the resin structure, initiating formation of an amorphous carbon. During this carbonization phase, the additive can agglomerate into larger uniform size domains because of the additive concentration and the surface energy of the additive particles. During the carbonization process, when the carbon molecules are condensing, the additive molecules can contact each other. Particularly, the high surface energy and the high temperature present in the carbonizing environment can reduce the energy barrier to sintering, leading to agglomeration of the additive molecules. Carbonization generally involves heating to a high temperature in inert or substantially inert atmosphere to remove low molecular weight molecules, leaving a substantially carbon residue behind. Carbonization can be performed in any inert or substantially inert environment. In one aspect, the carbonization atmosphere comprises nitrogen. The temperature at which carbonization occurs can vary, depending upon the specific components and concentrations thereof. In various aspects, the temperature to which a cured mixture is subjected ranges from about 500° C. to about 1,100° C. In a specific aspect, the temperature to which a cured mixture is subjected should be at least about 500° C.

The carbonized material can optionally be subjected to one or more steps to remove a portion of or all of the additive. The additive can be removed, in various aspects, via an extraction process, such as solvent extraction or steam extraction. Depending on the specific additive used, the additive removal method may differ. For inorganic molecules such as sodium or potassium salts, the removal may be conducted via exposure to water or steam at ambient or high pressures. In one aspect, an additive may be removed at low temperatures, such as at 300° C. As used herein, however, references to removing the additive, additive removal, and the like, are intended to cover aspects wherein at least a portion of an additive is removed during carbonization, after carbonization via an extraction processes, or both. Removal of an additive can comprise one or more separate steps of the same or varying type. In one specific aspect, removal of an additive can be performed via a leaching process. Any conventional leaching process may be utilized to ultimately form the carbon materials herein. In another specific aspect, removal of an additive can be performed by acid extraction to, for example, remove trace levels of additive materials. If an organic, combustible, and/or volatile additive is used, the additive or a portion thereof can combust and/or volatilize during the drying and/or carbonization step, thus leaving no or substantially no additive material to be removed.

The above referenced processes can result in a carbon material with a controlled porosity and enhanced pore diameters. While not wishing to be bound by theory, the carbon precursor can uniformly crosslink and/or condense around the additive molecules. Upon carbonization and removal of the additive, uniformly distributed open pores are formed where additive agglomerates were previously present. Also, because of the uniform mixing of the inorganic molecule into the carbon, the pores will deeply penetrate the carbon upon leaching. For example, it has been found that carbon materials manufactured by the methods described herein result in carbon materials with pores penetrating completely through the carbon material. As the additive molecules agglomerate within the mixture during the preparation process, larger voids are created between cross-linkages of the carbon precursor and carbon precursor additive, resulting in pores of greater diameter. For example, it has been found that a majority (greater than 50%, and in some aspects 75%) of the pores distributed about the carbon material have a pore diameter greater than 40 Å. Moreover, it has been found that the pores distributed about the carbon material can have a pore diameter in the range of 20-120 Å (pore size distribution). The large size of the pores can allow facile access to electrolyte ions to the entire surface area of the carbon material. This easy access can lead to lower ionic resistance, and hence, higher power density for an EDLC device incorporating such a carbon material.

The uniform distribution and agglomeration of the additive can further allow porosity of the carbon composition to be effectively controlled. Specifically, pore diameter size, distribution, and penetration can be better predicted as a result of the processes described above.

The carbon composition produced by the methods of the present invention can optionally be subjected to one or more additional treatments to modify the surface chemistry of the carbon, control the number and/or type of oxygen groups present on the surface, or adjust the surface area of the carbon composition. Such treatments can comprise any suitable techniques, such as, for example, heat treatment, activation via carbon dioxide, ozonation, exposure to acids, or a combination thereof.

Carbon materials manufactured by processes contemplated herein can be used to manufacture electrodes or other components for use in high energy devices. In order to fabricate an electrode from the carbon material, a novel carbon composition, such as that prepared by the methods of the present invention, can be ground and/or pulverized to a predetermined target particle size. In one aspect, the predetermined target median particle size is about 10 µm. In another aspect, the predetermined target particle size is less than 100 µm. The carbon composition can be ground and/or pulverized using any conventional technique and the present invention is not intended to be limited to a particular grinding and/or pulverizing technique. The ground and/or pulverized carbon material can then be combined with a carbon black, a powdered graphite, a metal powder, a conductivity promoting agent, or a combination thereof. A conductivity promoting agent, if used, can impart conductivity to the carbon material. A bonding agent, such as, for example, PTFE, PVDF, PE or PP or other aqueous solvent based binders known in the art can also be added. To produce a sheet electrode, such as are suitable for use in an electric double layer capacitor, these materials can be mixed together, if necessary, and rolled into a sheet. In one aspect, the compounding ratio of three components such as the carbon composition, the conductivity promoting agent, and the binding agent can be about 80 wt. % to about 95 wt. % or more carbon material, from about 1 wt. % to about 10 wt. % conductivity promoting agent, and from about 2 wt. % to about 10 wt. % binding agent. Of course, any conventional process for manufacturing an electrode utilizing the carbon materials described herein can by utilized.

Electrodes manufactured with carbon materials described herein can be incorporated into EDLC's with enhanced energy density and specific power. As previously discussed, EDLC's can include any device configured to store a charge including, for example, standard jelly roll designs, prismatic designs, honeycomb designs, hybrids (e.g., one electrode is carbon and the other electrode is a pseudo capacitance material such as a metal oxide, conducting polymers or others), supercapacitors, ultracapacitors or other designs known in the art. Moreover, EDLC's utilizing the carbon materials described herein can be constructed through any variety of conventional processes. The arrangement of the basic elements of one aspect of an EDLC is shown in FIG. 1. An electrolyte 20 is in contact with and able to permeate into two opposing porous electrodes 30. For example, the electrodes can be stacked on top of each other via a separator to form positive and negative electrodes. The electrodes can then be impregnated in an electrolyte solution. The electrolyte solution may include: i) a salt (i.e., $Me_3EtN^+$, $MeEt_3N^+$, $EtN^-$, $BF_4^-$, $PF_6^-$) or others known in the art dissolved in the organic solvent (i.e., Acetonitrile (AN), Propylene Carbonate (PC)), ii) a salt in an aqueous solvent (i.e., KOH or inorganic acids such as $H_2SO_4$) or iii) ionic liquids (i.e., TEA-TFB) and other electrolytes known in the art. The electrodes 30 can be in contact with and between two metallic current collectors 40. In the case of a fluid or compressible electrolyte, a separator or spacer 50, permeable by the electrolyte, can be interposed between the electrodes 30 to prevent shorting.

As expressed in the examples below, EDLC's assembled with electrodes including carbon materials manufactured by the processes contemplated herein result in EDLC's having energy densities of at least about 9 Wh/l and as high as in the range of about 14-16 Wh/l or greater. Such EDLC's also have a specific power of greater than about 3,000 W/kg and can exceed more than 7,000 W/kg. Such energy density and specific power have not heretofore been achievable through conventional processes.

Although several aspects of the present invention have been described in the detailed description, it should be understood that the invention is not limited to the aspects disclosed, but is capable of numerous rearrangements, modifications and substitutions without departing from the spirit of the invention as set forth and defined by the following claims.

EXAMPLES

To further illustrate the principles of the present invention, the following examples are put forth so as to provide those of ordinary skill in the art with a complete disclosure and description of how the compositions, articles, devices, and methods claimed herein are made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations should be accounted for. Unless indicated otherwise, temperature is ° C. or is at ambient temperature, and pressure is at or near atmospheric. There are numerous variations and combinations of process conditions that can be used to optimize product quality and performance. Only reasonable and routine experimentation will be required to optimize such process conditions.

Example 1

Preparation of Button Cell with Phenolic/Sulfur Composition

In a first example, a carbon composition was prepared by combining 225 g of a 45 wt. % aqueous potassium hydroxide solution, 75 g of a phenolic resole resin (about 70 wt. % resin/30 wt. % water), and 5.25 g of powdered elemental sulfur. The resulting mixture was dried and cured at 180° C. to form a sponge like mass. The dried mixture was then heated in a nitrogen atmosphere to a temperature of about 800° C. and held at that temperature for a period of about 6 hours to carbonize the resin.

The carbonized resin was subsequently steam treated and then acid washed to remove potassium from the carbon. The purified carbon was then ground to a mean particle size of about 10 μm.

The ground purified carbon was then mixed with 10 g of carbon black and 10 g of polytetrafluoroethylene (PTFE) to obtain a well mixed mass. Using a roll mill, the resulting mass was then rolled to obtain a thin film about 50 μm thick. Small carbon electrodes were then stamped out of the rolled thin film.

The electrodes were soaked in 1 M tetraethylammonium tetrafluoroborate (TEA-TFB) in acetonitrile. A porous separator was also soaked in the 1 M TEA-TFB solution. The porous separator and two carbon electrodes were then assembled into a button cell together with aluminum current collectors.

Voltammetric and galvanostatic tests were conducted on the assembled button cells to measure performance. The measured energy density of the button cell device was 14 Wh/l and the specific power of the device was 7,400 W/kg.

Example 2

Preparation of Button Cell

Comparative Example

In a second example, a button cell was prepared as in Example 1, except that a commercially available carbon, developed for ultracapacitor applications, was used instead of the inventive carbon composition. The BET (Brunauer-Emmett-Teller) surface area of the commercially available carbon was 1800 $m^2/g$. The energy density for the button cell prepared from this commercially available carbon was 6 Wh/l and the specific power was 3,707 W/kg, roughly half of that obtained from the button cell prepared with the inventive carbon composition.

Example 3

Preparation of Button Cell with Furan Resin Composition

In a third example, a button cell was prepared as in Example 1, using 225 g of a 45 wt. % potassium hydroxide solution, 50 g of a phenolic resole resin, and 50 g of a furan resin (Furalloy 3136 from Dynachem, Inc., Georgetown, Ill., USA). The carbon composition was subjected to each of the cure, carbonization, and activation steps described in Example 1. The resulting energy density and specific power of the button cell produced with this inventive composition were 16 Wh/l and 3,200 W/kg, respectively.

Example 4

Preparation of Button Cell with Furfuryl Alcohol Composition

In a fourth example, a button cell was prepared as in Example 1, using 225 g of a 45 wt. % potassium hydroxide solution, 50 g of a phenolic resole resin, and 50 g of a furfuryl alcohol polymer (Furalloy 175 from Dynachem, Inc., Georgetown, Ill., USA). The carbon composition was subjected to each of the cure, carbonization, and activation steps described in Example 1. The resulting energy density and specific power of the button cell produced with this inventive composition were 16 Wh/l and 3,461 W/kg, respectively.

Various modifications and variations can be made to the compositions, articles, devices, and methods described herein. Other aspects of the compositions, articles, devices, and methods described herein will be apparent from consideration of the specification and practice of the compositions, articles, devices, and methods disclosed herein. It is intended that the specification and examples be considered as exemplary.

What is claimed is:

1. A method for making a carbon composition, the method comprising:
contacting a carbon precursor, a carbon precursor modifier, and an additive to form a mixture;
curing at least the carbon precursor; and then
carbonizing at least a portion of the mixture to form a carbon composition; wherein the carbon precursor is non-graphitizable, the carbon precursor modifier comprises elemental sulfur, a surfactant, or a combination thereof, and the additive comprises an inorganic salt.

2. The method of claim 1, further comprising, after carbonizing, removing at least a portion of the additive from the carbon composition.

3. The method of claim 1, wherein the carbon precursor comprises a crosslinkable resin.

4. The method of claim 1, wherein the carbon precursor comprises a phenolic compound, a furan based compound, or a combination thereof.

5. The method of claim 1, wherein the carbon precursor modifier comprises a surfactant.

6. The method of claim 1, wherein the additive comprises sodium chloride, potassium chloride, sodium hydroxide, potassium hydroxide, or a combination thereof.

7. The method of claim 1, wherein the carbon composition comprises a plurality of pores, and wherein a majority of the plurality of pores have a diameter greater than about 40 Å and a pore diameter distribution in the range of about 20 Å to about 120 Å.

8. A method for forming an electrode, the method comprising,
a) providing a carbon composition formed by a method comprising contacting a carbon precursor, a carbon precursor modifier, and an additive to form a mixture; curing at least the carbon precursor; and then carbonizing at least a portion of the mixture; and then
b) forming at least a portion of the carbon composition into an electrode suitable for use in an electric double layer capacitor,
wherein the carbon precursor is non-graphitizable, the carbon precursor modifier comprises elemental sulfur, a surfactant, or a combination thereof, and the additive comprises an inorganic salt.

9. The method of claim 8, further comprising:
a) immersing at least a portion of the electrode into an electrolyte solution;
b) providing a current collector; and then
c) assembling the electrode, current collector, and the electrolyte solution to form an electric double layer capacitor.

* * * * *